United States Patent
Le Damany et al.

[11] Patent Number: 5,970,137
[45] Date of Patent: Oct. 19, 1999

[54] LOUDSPEAKER GAIN CORRECTION FOR A HANDS-FREE TELEPHONE TERMINAL

[75] Inventors: Yves Le Damany; Frédéric Zurcher; Marc Niberon, all of Lannion, France

[73] Assignee: Prescom, Montigny-le-Bretonneux, France

[21] Appl. No.: 08/894,674

[22] PCT Filed: Feb. 5, 1996

[86] PCT No.: PCT/FR96/00185

§ 371 Date: Aug. 27, 1997

§ 102(e) Date: Aug. 27, 1997

[87] PCT Pub. No.: WO96/27255

PCT Pub. Date: Sep. 6, 1996

[30] Foreign Application Priority Data

Feb. 27, 1995 [FR] France .................................. 95 02341

[51] Int. Cl.[6] .................................................. H04M 9/00
[52] U.S. Cl. ........................ 379/388; 379/202; 379/390; 379/406; 379/409; 379/420
[58] Field of Search ..................... 379/390, 388, 379/389, 391, 395, 402, 403, 409, 420, 444, 432, 410, 406, 202; 381/58, 59, 94.1, 104, 111

[56] References Cited

U.S. PATENT DOCUMENTS

| | | | |
|---|---|---|---|
| 4,454,384 | 6/1984 | Ferrieu | 379/390 |
| 4,712,231 | 12/1987 | Julstrom | 379/202 |
| 4,741,025 | 4/1988 | Maruyana et al. | 379/202 |
| 4,989,242 | 1/1991 | Arnaud | 379/390 |
| 5,430,796 | 7/1995 | Komoda et al. | 379/388 |
| 5,535,433 | 7/1996 | Kurokawa et al. | 379/390 |
| 5,544,242 | 8/1996 | Robinson | 379/390 |
| 5,553,134 | 9/1996 | Allen et al. | 379/390 |
| 5,612,996 | 3/1997 | Li | 379/388 |
| 5,657,384 | 8/1997 | Staudacher et al. | 379/411 |
| 5,680,450 | 10/1997 | Dent et al. | 379/388 |
| 5,768,364 | 6/1998 | Karnowski et al. | 379/420 |
| 5,796,818 | 8/1998 | Mcclennon et al. | 379/388 |

FOREIGN PATENT DOCUMENTS

| | | |
|---|---|---|
| 0 515 242 | 11/1992 | European Pat. Off. |
| 0 614 304 | 9/1994 | European Pat. Off. |
| 91 03116 | 3/1991 | WIPO |

*Primary Examiner*—Forester W. Isen
*Assistant Examiner*—Jacques M. Saint-Surin
*Attorney, Agent, or Firm*—Lowe Hauptman Gopstein Gilman & Berner

[57] ABSTRACT

A hands-free telephone terminal includes a loudspeaker (HP), a microphone (MI) and loudspeaker gain control means (AUG, DIM, PP). A loudspeaker gain correction method cyclically determines a listening comfort index to deduce gain modification parameters. If the local user modifies the loudspeaker gain using the control means, the gain modification parameters weight the loudspeaker gain to optimize listening comfort during a telephone conversation for the local user and for the remote user.

17 Claims, 13 Drawing Sheets

| | |
|---|---|
| E1<br>(FIG.4) | Compression of transmit and receive signals<br>ICOMPE          ICOMPR |
| E2<br>(FIG.5) | Selection of dominant signal<br>IGEXP |
| E3<br>(FIG.6) | Security attenuation<br>IGSECU |
| E4 | Transmit residual echo index : IAER |
| E5 | Gain variation<br>IGE          IGR |

FIG.3

LOUDSPEAKER GAIN CORRECTION FOR A HANDS-FREE TELEPHONE TERMINAL

BACKGROUND OF THE INVENTION

1. Field of the Invention

The present invention concerns a loudspeaker gain correction method for a "hands-free" telephone terminal or for an audioconference telephone terminal.

2. Description of the Prior Art

A hands-free telephone set or telephone terminal includes a sound pick-up device with one or more microphones, a sound output device with one or more loudspeakers and transmit and receive signal processing circuits. These circuits include an acoustic echo canceller, an electric echo canceller and a gain variation device for attenuating the signals transmitted during a telephone conversation to prevent the Larsen effect. The attenuation is determined by the dominant transmission direction and by the performance of the echo cancellers.

A user controls the listening level by modifying the loudspeaker gain. The higher the chosen listening level, the less attenuation is applied to the non-dominant transmission direction. This attenuation is called the stability gain and takes a positive value less than unity. An excessively high attenuation, for example greater than 10 dB, would make listening more uncomfortable for the local user and for the other party, called as a remote user. The latter perceive variations in the levels of the speech signals transmitted and have the sensation of a half-duplex communication. When choosing the listening level, the local user is most sensitive to the sound intensity of the voice of the remote user and chooses an excessively high listening level. Unknown to them, this then causes a deterioration of the overall quality of the audioconference, in particular through a progressively more accentuated sensation of half-duplex communication. This sensation is all the stronger for the remote user if he is using the handset of his telephone.

OBJECT OF THE INVENTION

The object of this invention is to provide a loudspeaker gain correction method for optimizing listening comfort during a telephone conversation, not only for the local user but also for the remote user.

SUMMARY OF THE INVENTION

Accordingly, a method of loudspeaker gain correction in a hands-free telephone terminal having a loudspeaker at the output of a receive channel and a microphone at the input of a transmit channel, and gain control means for commanding modifications of the loudspeaker gain, the transmit and receive channels being served by a telephone line, is characterized in that it comprises the cyclic steps of:

measuring a transmit signal on the transmit channel and a receive signal on the receive channel, determining a transmit compression gain and a receive compression gain respectively so that the product of the measured transmit signal by the transmit compression gain is between two predetermined thresholds and the product of the measured receive signal by the receive compression gain is between two other predetermined thresholds, measuring an output signal of the microphone on the transmit channel and an input signal of the loudspeaker on the receive channel, comparing the measured microphone output signal and the measured loudspeaker input signal to determine an acoustic echo path gain between the loudspeaker and the microphone, determining a stability gain as a function of the transmit compression gain, receive compression gain, acoustic echo path gain and loudspeaker gain, determining a listening comfort index as a function of the stability gain and the listening comfort index of the preceding cycle, comparing the listening comfort index with predetermined thresholds, selecting two of the predetermined thresholds bracketing the listening comfort index and defining a range of variation of the listening comfort index with which are associated gain modification parameters, and modifying the loudspeaker gain controlled by the gain control means with the loudspeaker gain weighted by the modification parameters.

The method of the invention matches the loudspeaker gain modifications commanded by the user to the listening comfort so that a gain modification does not deteriorate, and preferably enhances, the listening quality if the latter is not good. The loudspeaker gain modifications commanded by the user are weighted in accordance with the listening comfort. In practise the listening comfort index is inversely proportional to the listening comfort.

The correction method of the invention can further comprise at least one of the following steps:

if the telephone terminal includes acoustic echo cancelling means through which the transmit and receive channels pass, measuring an input signal of the acoustic echo canceller means on the transmit channel for comparison with the measured transmit signal, said measured transmit signal being measured at the output of the acoustic echo cancelling means, thereby determining an acoustic echo canceller gain between the input and output of the transmit channel in the acoustic echo cancelling means, measuring a signal at the output of the transmit channel and a signal at the input of the receive channel, and comparing the signals measured at the output of the transmit channel and at the input of the receive channel to determine an electric echo path gain between the output of the transmit channel and the input of the receive channel, preferably concomitantly with the step of determining an acoustic echo path gain, and if a telephone line side electric echo canceller is provided at the output of the transmit channel and at the input of the receive channel, measuring an output signal of the electric echo cancelling means on the receive channel for comparison with the signal measured at the input of the receive channel, said receive channel input corresponding to the input of the electric echo canceller means, thereby determining an electric echo canceller gain between the input and output of the receive channel in the electric echo canceller means, preferably concomitantly with the step of determining an acoustic echo canceller gain.

The stability gain is determined also in accordance with the electric echo canceller gain and/or the acoustic echo path gain, and/or the electric echo canceller gain.

The gain modification parameters are preferably constant within any range of variation of the listening comfort index defined by two of the predetermined thresholds. The gain modification parameters can include a loudspeaker gain increase increment, respectively decrease decrement, which varies in inverse proportion, respectively in direct proportion, to the listening comfort index.

The gain modification parameters can also include a time-delay between two successive loudspeaker gain increases, respectively decreases, corresponding to two successive commands to increase, respectively to decrease, the loudspeaker gain, the time-delay between two increases, respectively decreases, varying in direct proportion, respectively in inverse proportion, to the listening comfort index.

In practice, the correction method according to the invention comprises consecutively upon a command to increase, respectively to decrease, the loudspeaker gain, the steps of:

verifying if the increase, respectively decrease, command is separated by less than a predetermined separation timed from a preceding increase, respectively decrease, command, and in the affirmative, to increase with a predetermined increase increment, respectively to decrease with a particular decrease decrement, the loudspeaker gain only after the increase time-delay, respectively the decrease time-delay.

According to another feature of the invention, the correction method comprises the step of displaying the value of the listening comfort index by activating one of plural first display means. More precisely, the step of displaying the value of the listening comfort index comprises:

comparing the listening comfort index to predetermined lower and upper display thresholds, said lower display thresholds being respectively linked to the upper display thresholds to define ranges of variation of the listening comfort index which overlap partially in pairs, each range of variation of the listening comfort index being associated with one of the first display means, activating the first display means associated with the range of variation in which the comfort index is located if the comfort index lies between the lower and upper display thresholds and defining the range of variation, and activating the first display means of lower rank, respectively higher rank, if the comfort index leaves the range of variation associated with the display means activated by the lower threshold, respectively upper threshold, defining the range of variation.

Preferably, the plural first display means are of various colors, the wavelengths of said various colors increasing with the comfort index. For example, the first display means are green for first ranges of comfort index variation, yellow or orange for second ranges of comfort index variation and red for third ranges of comfort index variation. The choice of these colors encourages the local user to reduce the listening level so that the listening comfort index remains within the ranges for which the listening comfort experienced by the local user and the remote user is good, i.e. with no sense of half-duplex communication.

According again to another feature of the invention, the method comprises the step of displaying the value of the loudspeaker gain on plural second display means.

In the step of displaying the value of the loudspeaker gain, the second display means display a gain value more than the actual value of the loudspeaker gain if the comfort index is more than a predetermined offset threshold. The second display means preferably show one of plural gain values more than the actual value of the loudspeaker gain if the comfort index is more than a respective one of a plurality of predetermined thresholds.

Furthermore, the method can comprise the steps of:

comparing the listening comfort index with a high predetermined fourth threshold, and reducing the loudspeaker gain by a predetermined value if the listening comfort index is more than the fourth threshold during a predetermined time-delay.

In this case, the loudspeaker gain is modified without intervention by the user.

BRIEF DESCRIPTION OF THE DRAWINGS

Other features and advantages of the present invention will become apparent more clearly from a reading of the following description of several preferred embodiments of the invention with reference to the corresponding accompanying drawings, in which:

FIG. 3 is a telephone terminal transmit and receive gain control algorithm;

DESCRIPTION OF THE PREFERRED EMBODIMENTS

Figure 1:
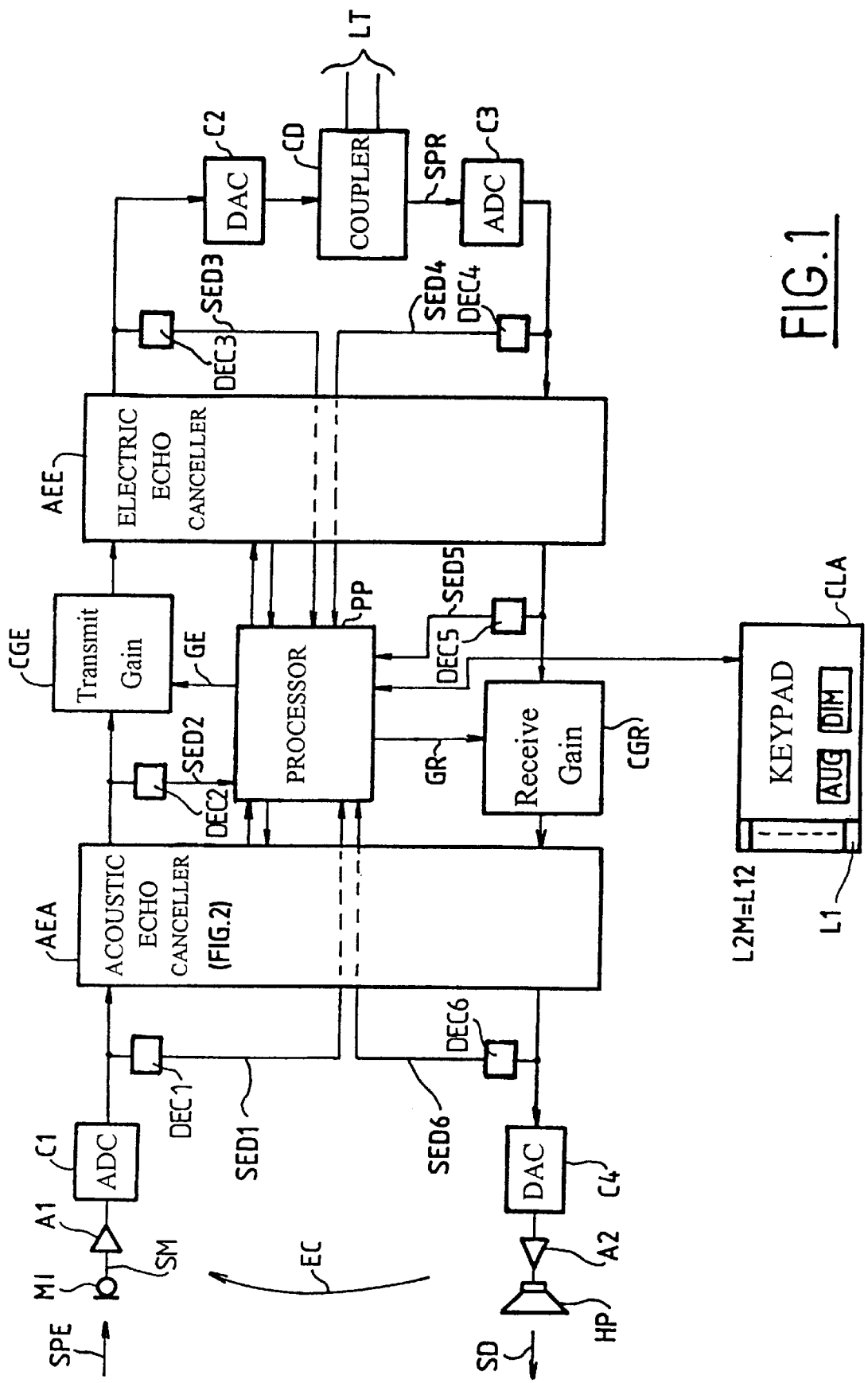
FIG. 1 is a block diagram of a hands-free telephone terminal.

Referring to FIG. 1, a hands-free telephone terminal comprises a first transmission channel, called as a transmit channel. The transmit channel includes a microphone MI, or plural microphones, connected to an amplifier A1 and to an analog-to-digital converter C1. An output of the converter C1 is connected to a first input of an acoustic echo canceller circuit AEA, a first output of which is connected to a transmit gain control circuit CGE. The transmit gain control circuit CGE is connected to a first input of an electric echo canceller circuit AEE. A first output of the circuit AEE is connected to a two-wire analog telephone line LT of the telephone network through a digital-to-analog converter C2 followed by a 4-wire/2-wire differential coupler CD.

A second transmission channel of the telephone terminal constitutes a receive channel in the opposite direction to the transmit channel and comprises at the output of the differential coupler CD an analog-to-digital converter C3 connected to a second input of the electric echo canceller circuit AEE. A second output of the circuit AEE is connected through a receive gain control circuit CGR to a second input of the acoustic echo canceller circuit AEA. A second output of the circuit AEA is connected to a digital-to-analog converter C4 followed by an amplifier A2 and a loudspeaker HP, or plural loudspeakers.

If the terminal is connected to a 4-wire telephone line it does not comprise any differential coupler CD.

The invention also concerns a hands-free terminal that does not comprise any electric echo canceller circuit and/or any acoustic echo canceller circuit, regardless of the type of telephone line to which it is connected: 2 wires or 4 wires, analog or digital.

The terminal comprises a keypad CLA accessible to the user. The keypad CLA comprises alphanumeric keys for entering the telephone number of a remote user to be called, and keys for switching from hands-free operation to operation using the ear piece and the microphone of the handset, for interrupting one of the transmission directions ("confidential" loudspeaker or microphone), and AUG and DIM keys for respectively increasing and reducing the gain of the loudspeaker HP.

In the hands-free terminal, a control processor PP controls the acoustic echo canceller circuit AEA, the electric echo canceller circuit AEE and the transmit and receive gain control circuits CGE and CGR. The transmit and receive gain are controlled by an algorithm described in detail below.

The hands-free terminal further comprises six peak envelope detectors DEC1 through DEC6. In the transmit channel, the inputs of the detectors DEC1 and DEC2 are respectively connected to the first input and to the first output of the acoustic echo canceller circuit AEA, and the input of the detector DEC3 is connected to the first output of the electric echo canceller circuit AEE. In the receive channel the inputs of the detectors DEC4 and DEC5 are respectively connected to the second input and to the second output of the electric echo canceller circuit AEE, and the input of the detector DEC6 is connected to the second output of the acoustic echo canceller AEA.

A peak envelope detector DECi, where i is an integer between 1 and 6, includes a full-wave detector followed by a non-linear filter having a very short time constant for increasing the level of the signal to be detected, a holding time, and a greater time constant for reducing the level.

The peak envelope detectors DEC1 through DEC6 apply respective peak envelope signals SED1 through SED6 to the control processor PP.

In practise the peak envelope signal SEDi is undersampled, for example at a frequency of 1 kHz, compared to the signal to be detected, which is typically sampled at a frequency of 8 kHz in the converters C1 and C3.

The receive channel receives a signal SPR combining a speech signal from a remote user received via the telephone network and telephone line LT, and an electric echo signal resulting from electric coupling between the transmit direction and the receive direction via the coupler CD, to produce the signal SPR in the form of a signal SD output by the loudspeaker HP. The transmit channel receives via the microphone MI a microphone signal SM combining a speech signal SPE of the local user and an acoustic echo signal EC resulting from acoustic coupling between the loudspeaker HP and the microphone MI.

Figure 2:
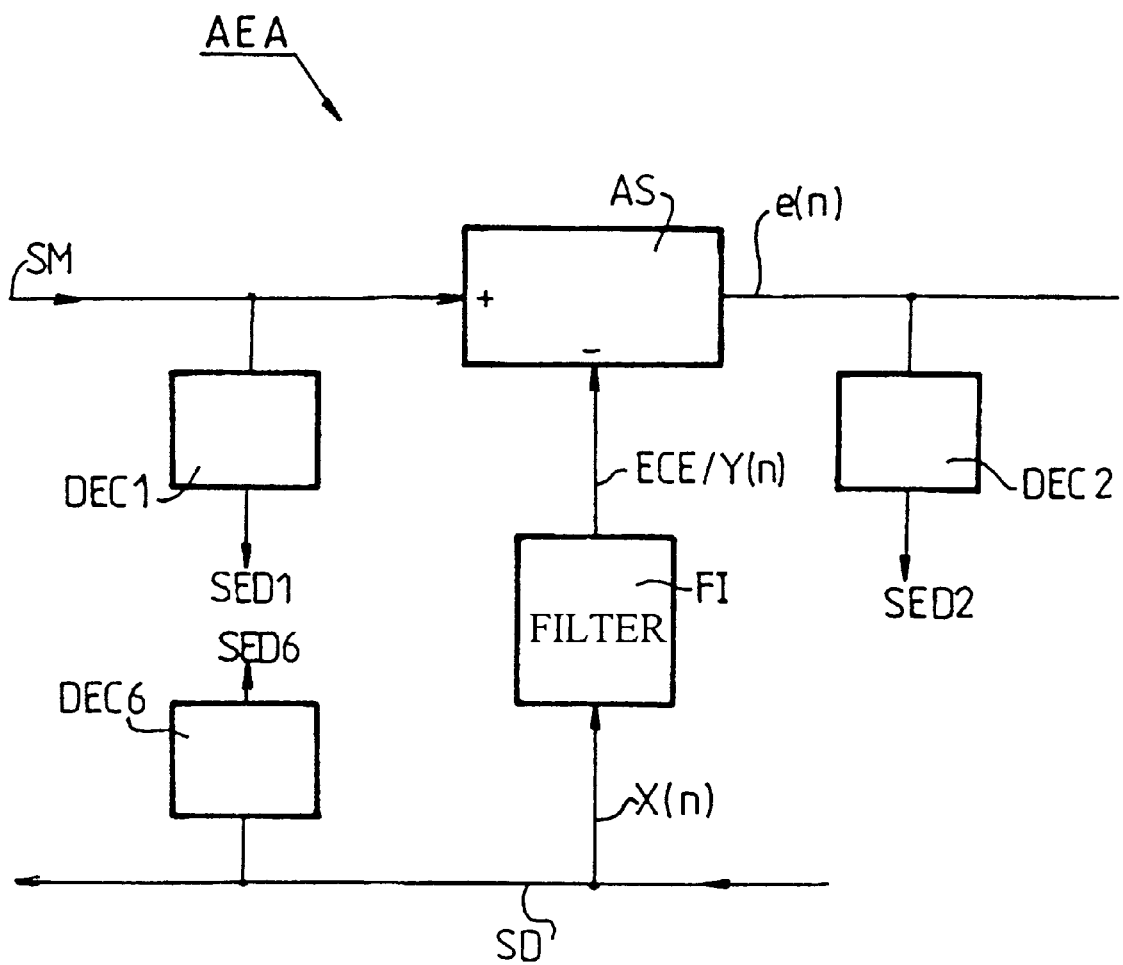
FIG. 2 is a diagram showing an acoustic echo canceller circuit included in the telephone terminal from FIG. 1.

Referring to FIG. 2, the acoustic echo canceller circuit AEA conventionally comprises a transversal filter FI with I stages where I has the value 1 536, for example. The filter estimates the acoustic echo EC in the form of an estimated acoustic echo ECE using an adaptive echo identification algorithm known in itself. The estimated acoustic echo ECE is applied to a "−" input of an adder-subtractor AS, a "+" input of which receives the microphone signal SM digitized by the converter C1.

To be more precise, the filter FI receives samples X(n) of the output SD supplied by the receive gain control circuit CGR and calculates samples Y(n) of the estimated acoustic echo ECE using the equation:

$$Y(n) = \sum_{i=0}^{I-1} h_n(i) \cdot X(n-i).$$

In the preferred embodiment, the coefficients $h_n(i)$ represent a correlation function H at a time n and are determined by the equation:

$$h_{n+1}(i) = h_n(i) + K(n) \cdot X(n-i) \cdot e(n),$$

in which K(n) denotes a convergence rate factor at time n which is calculated in the control processor PP, and e(n) is an estimation error signal in the absence of signal SPE.

The electric echo canceller circuit AEE is similar to the acoustic echo canceller circuit AEA. The electrical echo is the result of the contribution of the signal transmitted in the transmit direction to the signal transmitted in the receive direction via the differential coupler CD.

Referring to FIG. 3, a transmit and receive gain control algorithm comprises five main steps E1 through E5. The gain control algorithm is implemented in the control processor PP. The steps E1 through E5 are effected cyclically, for example at the sampling frequency of the peak envelope detectors, which is 1 kHz, for example. In the remainder of the description, a gain expresses a ratio between two numerical signal values to be compared that can be greater than or less than unity, and usually positive. In practise, a gain lies usually between 0 and 1. A gain is associated with an index which expresses the gain on a logarithmic scale, for example in units of −0.5 dB. When the gain has the value 1, the associated index is equal to 0.

Step E1 is the regulation of the levels of signals SM and SPR in the transmit and receive channels. The level in the transmit channel depends in particular on the position of the local speaker or speakers relative to the microphone MI. The receive level depends in particular on the length of the 2-wire transmission line LT. The transmit and receive signals SM and SPR have average levels that can be very different therebetween and that can vary during a telephone conversation. Regulating the transmit and receive signal levels consists in attenuating the signals, a process also called as a signal compression.

Figure 4:
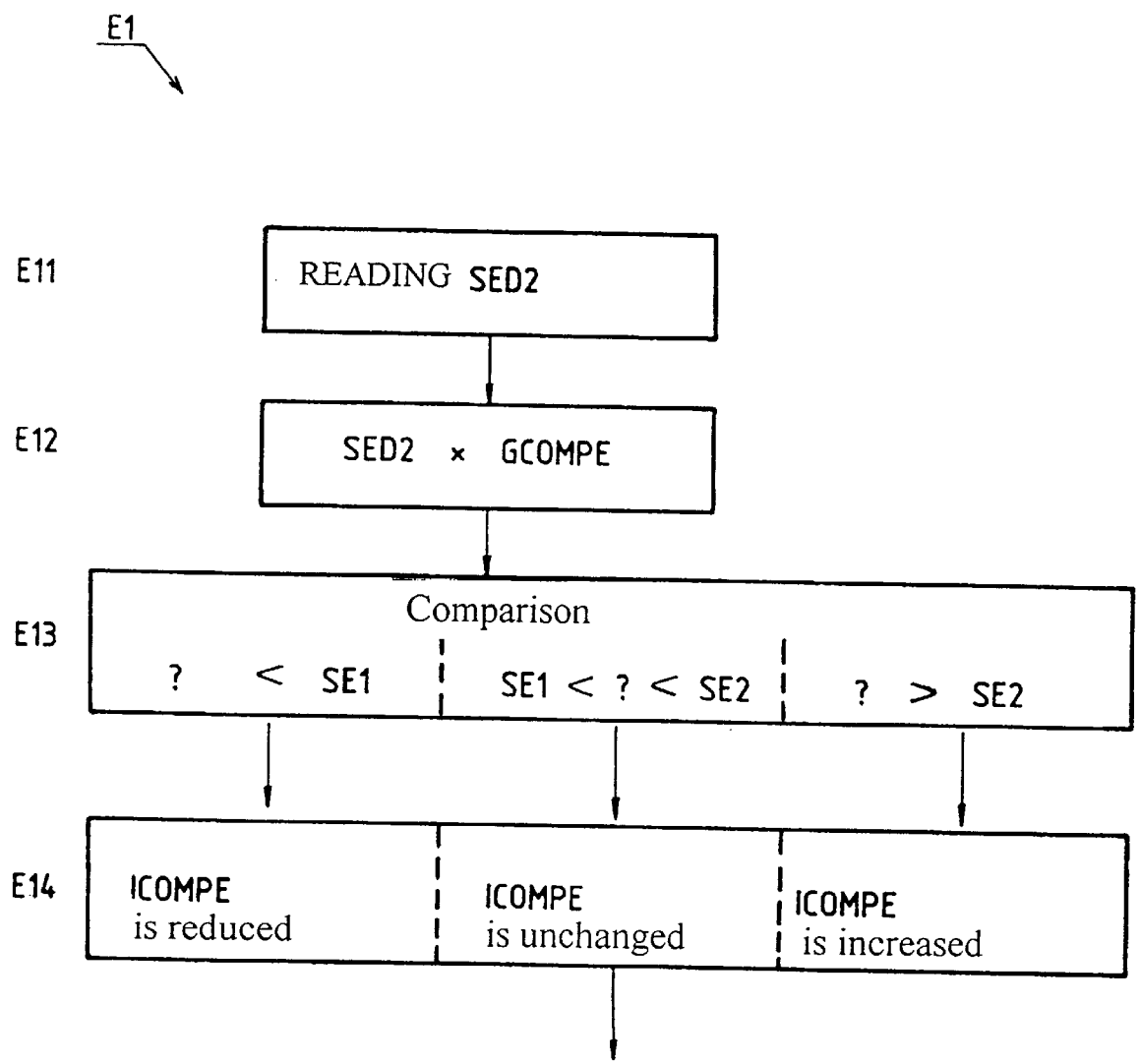
FIG. 4 is a simplified transmit and receive level compression algorithm included in the algorithm from FIG. 3.

Step E1 is made up of four substeps E11 through E14 which are described for the transmit channel with reference to FIG. 4.

In the transmit channel, the detector DEC2 applies a detected peak envelope signal SED2 to the processor PP.

The processor reads the signal SED2 in the substep E11 and in the substep E12 multiplies the signal SED2 by a transmit compression gain GCOMPE such that the product SED2.GCOMPE lies in a range of variation defined by two predetermined thresholds SE1 and SE2. A transmit compression index ICOMPE is associated with the gain GCOMPE. The integer index ICOMPE expresses the gain in units of −0.5 dB.

In substep E13, signal SED2.GCOMPE is compared with the thresholds SE1 and SE2. The index ICOMPE is increased or reduced or remains unchanged in the substep E14 according to the results of the comparison in the substep E13. Thus if the signal SED2.GCOMPE is more than the higher of the two thresholds, i.e. SE2, the index ICOMPE is increased by a first predetermined value. If the signal SED2.GCOMPE is less than the lower of the two thresholds, i.e. SE1, the index ICOMPE is reduced by a second predetermined value. Finally, if the product SED2.GCOMPE is between the two thresholds, the index ICOMPE is unchanged.

In a similar manner, on the receive channel, the detector DEC5 applies a detected peak envelope signal SED5 to the processor PP. Signal SED5 is multiplied by a receive compression gain GCOMPR and the resulting product is compared with two predetermined thresholds SR1 and SR2. Depending on the result of the comparison, a receive compression index ICOMPR expressing the gain GCOMPR in units of −0.5 dB is increased or reduced or remains unchanged.

Step E1 produces the transmit and receive compression indices ICOMPE and ICOMPR.

Referring again to FIG. 3, the control processor PP selects in the step E2 the dominant transmission direction, i.e. the transmit channel or the receive channel which carries the stronger wanted (usually speech) signal. The step E2 comprises three substeps E21 through E23.

Figure 5:
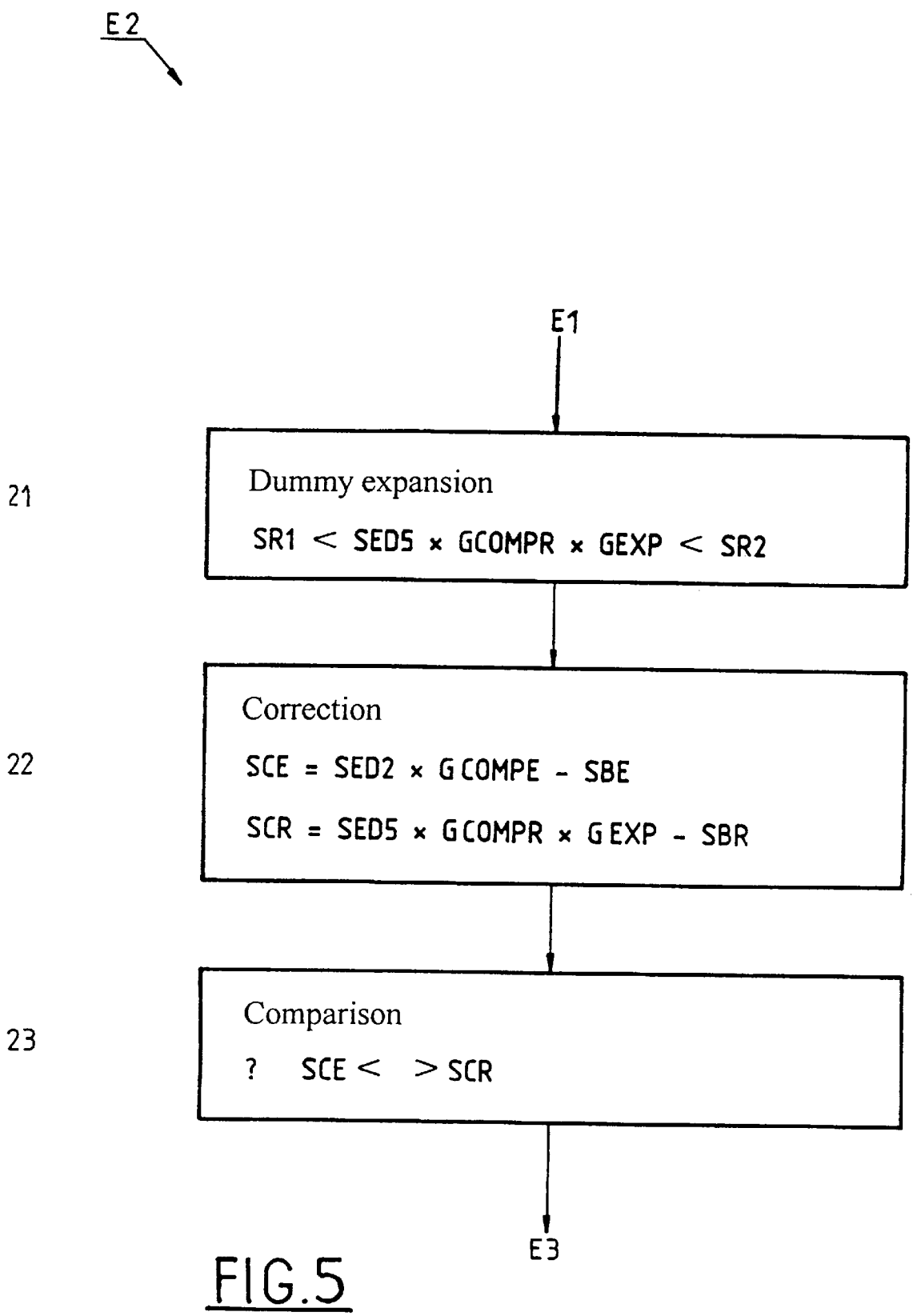
FIG. 5 is a simplified transmit or receive dominant signal selection algorithm included in the algorithm from FIG. 3.

Referring to FIG. 5, the substep E21 is an additional compensation applied to the receive channel to allow for high attenuations by the line LT. The substep E21 determines an integer dummy expansion index IGEXP, for example lying between 0 and 24, expressed in units of −0.5 dB, to which a dummy expansion gain GEXP corresponds. The index IGEXP is determined so that the relation $$SR1 < SED5.GCOMPR.GEXP < SR2$$

is true with a greater time constant than the relation $$SR1 < SED5.GCOMPR < SR2$$

in the corresponding substep E13 so that the index IGEXP takes account only of level changes due to the length of the line and not to any changes of elocution, which are catered for by the index ICOMPR. The dummy expansion depends on the telephone line, in particular its attenuation per line length unit, and not on the receive signal.

The substep E22 corrects signal SED2.GCOMPE, SED5.GCOMPR.GEXP to produce a corrected signal SCE, SCR so that the noise levels do not impede the next step. For this, in the substep E22, a respective noise threshold SBE, SBR calculated in the control processor PP is subtracted from signal SED2.GCOMPE, SED5.GCOMPR.GEXP.

The substep E23 compares the levels of the corrected transmit signal SCE and the corrected receive signal SCR to determine the dominant signal and thereby the dominant transmission channel. To make the selection of the dominant channel more stable, switching between the dominant transmission channel and the non-dominant transmission channel is effected with a hysteresis cycle.

Figure 6:
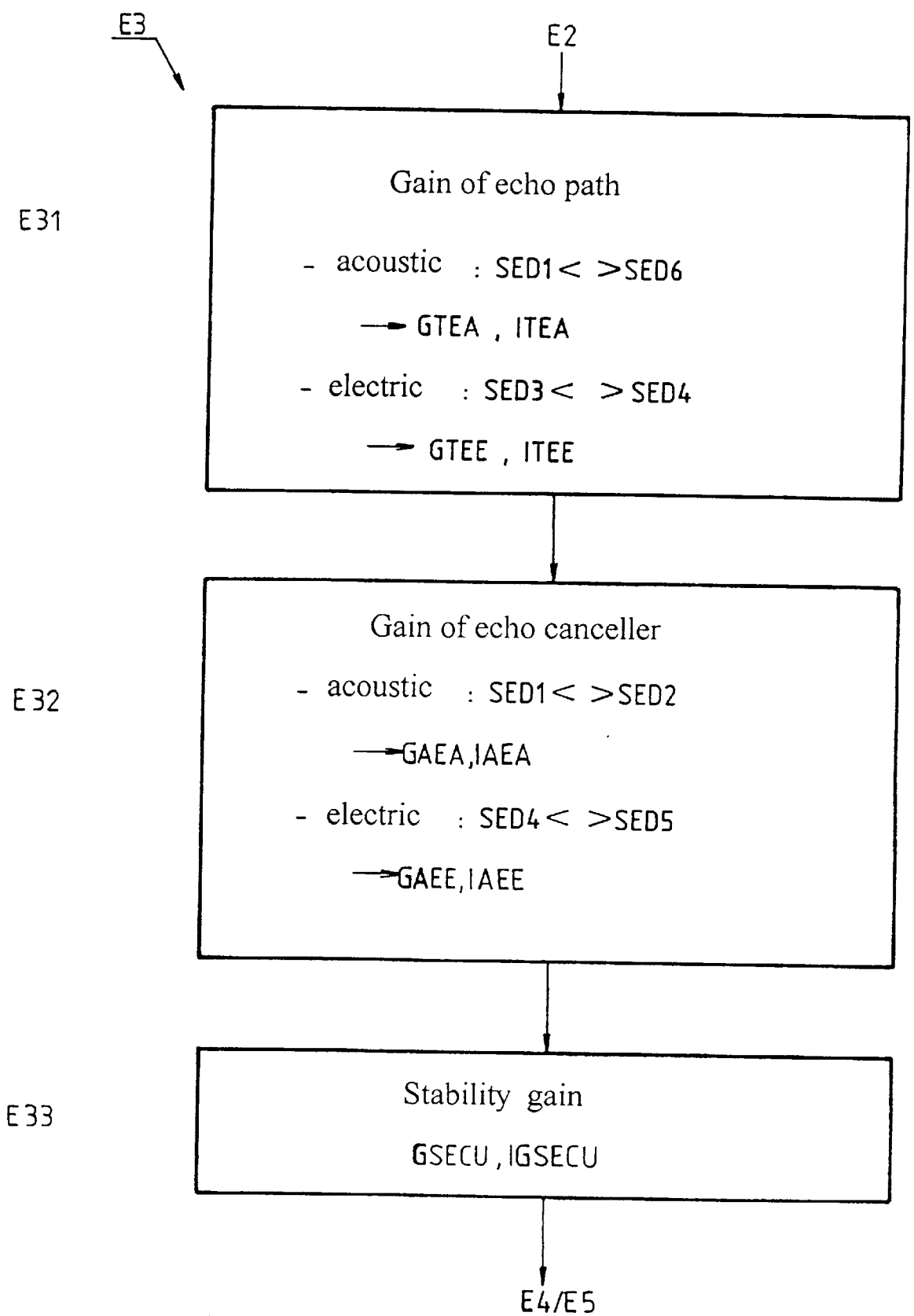
FIG. 6 is a stability gain determination algorithm included in the algorithm from FIG. 3.

Referring to FIGS. 1, 2 and 6, step E3 of determining a stability gain comprises three substeps E31 through E33. The stability gain introduces a security attenuation.

In the substep E31, the peak envelope signals SED1 and SED6 supplied by the detectors DEC1 and DEC6 are compared to determine an acoustic echo path gain GTEA and an associated integer index ITEA expressed in units of −0.5 dB. Similarly, peak envelope signals SED3 and SED4 supplied by the detectors DEC3 and DEC4 are compared to determine associated electric echo path gain and integer attenuation index GTEE and ITEE.

In the substep E32, the peak envelope signals SED1 and SED2, SED4 and SED5, supplied by the detectors DEC1 and DEC2, DEC4 and DEC5, are respectively compared to determine acoustic and electric echo canceller gains and attenuation indices GAEA, IAEA and GAEE, IAEE.

The substep E33 is intended to prevent the Larsen effect and to stabilize the system comprising the two terminals on the premises of the local and remote users, by determining a stability gain GSECU associated with an integer security attenuation index IGSECU dependent on the following relation:

$$IGSECU+IGHP+ICOMPE+ICOMPR+ITEA+ITEE+IAEA+IAEE>ISECU.$$

If the above relation is true, then the index IGSECU is reduced by one unit. In the above relation, ISECU is an integer threshold determined experimentally and IGHP is an integer loudspeaker gain index associated with a loudspeaker gain GHP. The loudspeaker gain GHP has an initial value equal to 9 dB, for example, and is modified by the local user by pressing the AUG and DIM keys, as explained below.

If the above relation is not true, then the index IGSECU is increased by one unit.

In a first embodiment, the algorithm goes direct from step E3 to step E5. Step E5 determines the gains GE and GR applied to the transmit and receive signals by the transmit and receive gain control circuits CGE and CGR. The gains GE and GR depend on the receive or transmit channel which carries the dominant speech signal determined in substep E23. Integer gain indexes IGE and IGR are associated with gains GE and GR. If the dominant signal is on the transmit channel, i.e. if SCE>SCR, then the indices IGE and IGR are determined by the relations:

$$IGE=ICOMPE$$

$$IGR=ICOMPR+IGHP+IGSECU.$$

Conversely, if the dominant signal is on the receive channel, i.e. if SCR>SCE, the indices IGE and IGR are determined by the relations:

$$IGE=ICOMPE+IGSECU$$

$$IGR=ICOMPR+IGHP.$$

In a second embodiment, the algorithm also determines an integer residual echo attenuation index IAER in step E4, between steps E3 and E5. The index IAER controls attenuation of a residual echo in the transmit channel that may be perceived by the remote user. If the following relation is true:

$$IAER+IGHP+IGSECU+ICOMPE+ICOMPR+ITEA+IAEA>IECHO$$

then the residual echo attenuation index IAER is reduced by one unity. Otherwise, the index IAER is increased by one unity. The index IECHO is a threshold determined experimentally.

The index IAER is preferably determined only if the acoustic echo attenuation index IAEA determined in the substep E32 is more than a particular threshold.

Accordingly, when the index IAER is determined in the step E4, the step E5 determines the transmit and receive gain indices IGE and IGR in accordance with the relations:

$$IGE=ICOMPE$$

$$IGR=ICOMPR+IGHP+IGSECU,$$

if the transmit signal is dominant, and in accordance with the relations:

$$IGE=ICOMPE+IGSECU+IAER$$

$$IGR=ICOMPR+IGHP,$$

if the receive signal is dominant. The residual echo is perceptible only if the receive signal is sufficiently strong and therefore dominant. The index IAER is then added.

Figure 7:
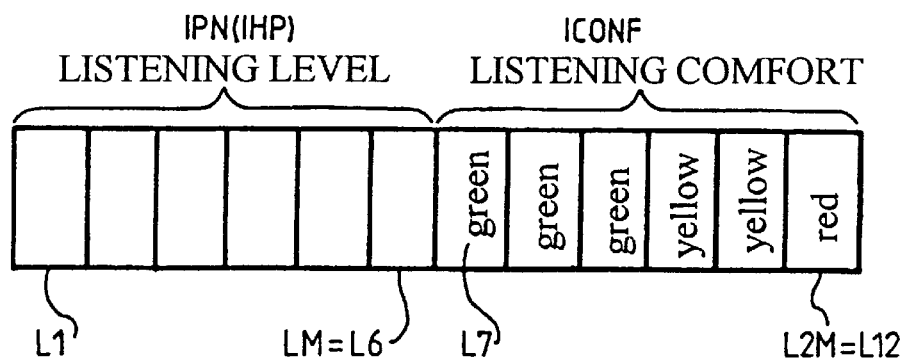
FIG. 7 shows listening level and listening comfort display means in the telephone terminal from FIG. 1.

Referring to FIG. 7, a display panel of the hands-free telephone terminal is provided for the user and includes 2M light-emitting diodes L1 through L2M, M being an integer equal to 6, for example. The display panel is connected to the keypad CLA, for example, and includes other diodes, for example a diode to indicate activation of the "confidential" key.

A first group of diodes, for example L1 through LM=L6, provides a listening level indication to the user. A second group of diodes, for example L(M+1)=L7 through L2M= L12, supplies a listening comfort indication to the user. The numbers of diodes in the groups are arbitrary and can be different. The listening level diodes L1 through L6 are preferably all the same color. On the other hand, the listening comfort diodes L7 through L12 are different colors. For example, the diode L12 is red, the diodes L10 and L11 are yellow or orange and the diodes L7 through L9 are green. In an alternate embodiment, the diodes L1 through L12 are replaced by a liquid crystal screen comprising either digits or juxtaposed blocks symbolizing cursors running across a graduated scale.

Figure 8:
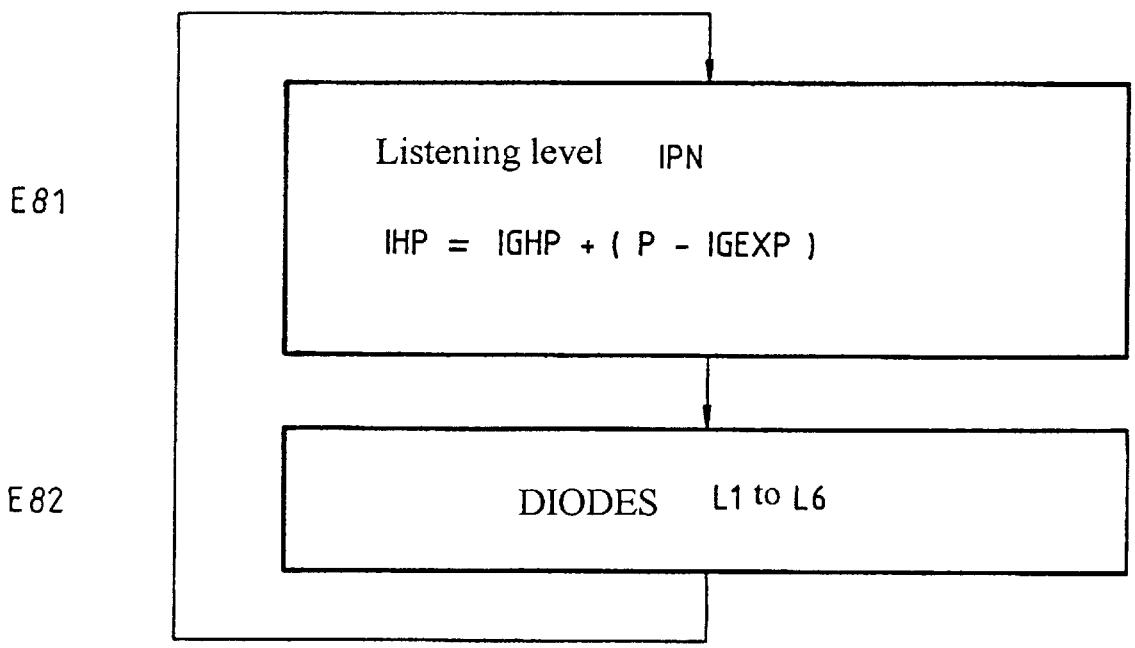
FIG. 8 is an algorithm of the invention for determining the listening level.

Referring to FIG. 8, the processor PP turns on the listening level diodes L1 through LM=L6 as a function of the loudspeaker gain GHP and the dummy expansion gain GEXP calculated in the substep E23, in two cyclic steps E81 and E82. To this end, an index IHP relating to a sound intensity supplied by the loudspeaker HP is calculated in step E81 from the relation:

$$IHP=IGHP+(P-IGEXP),$$

where P is an integer corresponding to the maximal value of IGEXP, equal to 24 for example. The index IHP is expressed in units of −0.5 dB. The sound intensity is maximal if IHP is null, and decreases by 0.5 dB each time IHP is increased by one unit.

A level range index IPN is equal to one of six discrete values 1 through M=6 depending on the value of the index IHP, in accordance with the following relations:

| if | | then |
|---|---|---|
| | $24 \leq IHP$ | then IPN = 1 |
| | $18 \leq IHP < 24$ | then IPN = 2 |
| | $12 \leq IHP < 18$ | then IPN = 3 |
| | $8 \leq IHP < 12$ | then IPN = 4 |
| | $4 \leq IHP < 8$ | then IPN = 5 |
| | $0 \leq IHP < 4$ | then IPN = 6 = M |

The level range index IPN depends on the loudspeaker gain and represents the sound level supplied by the loudspeaker HP. Depending on the value 1 through 6 of the index IPN, the respective diode L1 through L6 is activated, i.e. turned on, in the step E82. The diode L1 is activated when IPN is 1, diode L2 when IPN is equal to 2, and so on.

The user increases or reduces the loudspeaker gain GHP by pressing the AUG or DIM key on the keypad CLA. Consequently, the status of the diodes L1 through L6 is modified in accordance with the value of the index IPN calculated with the new value of the index IGHP. When the user presses the AUG, respectively DIM key, the diode of the next higher, respectively lower, rank to the diode currently turned on blinks if the diode currently turned on is not the diode L6, respectively L1. A listening level diode is activated until a new value of the index IPN is determined and another diode is activated accordingly.

In an alternate embodiment, a listening level diode remains activated for a few seconds after the user stops pressing the AUG or DIM key.

In another alternate embodiment, for a given value of IPN, for example 3, all the diodes having a rank less than and equal to the value of the index IPN are activated, i.e. the diodes L1, L2 and L3 in this example.

Figure 9:
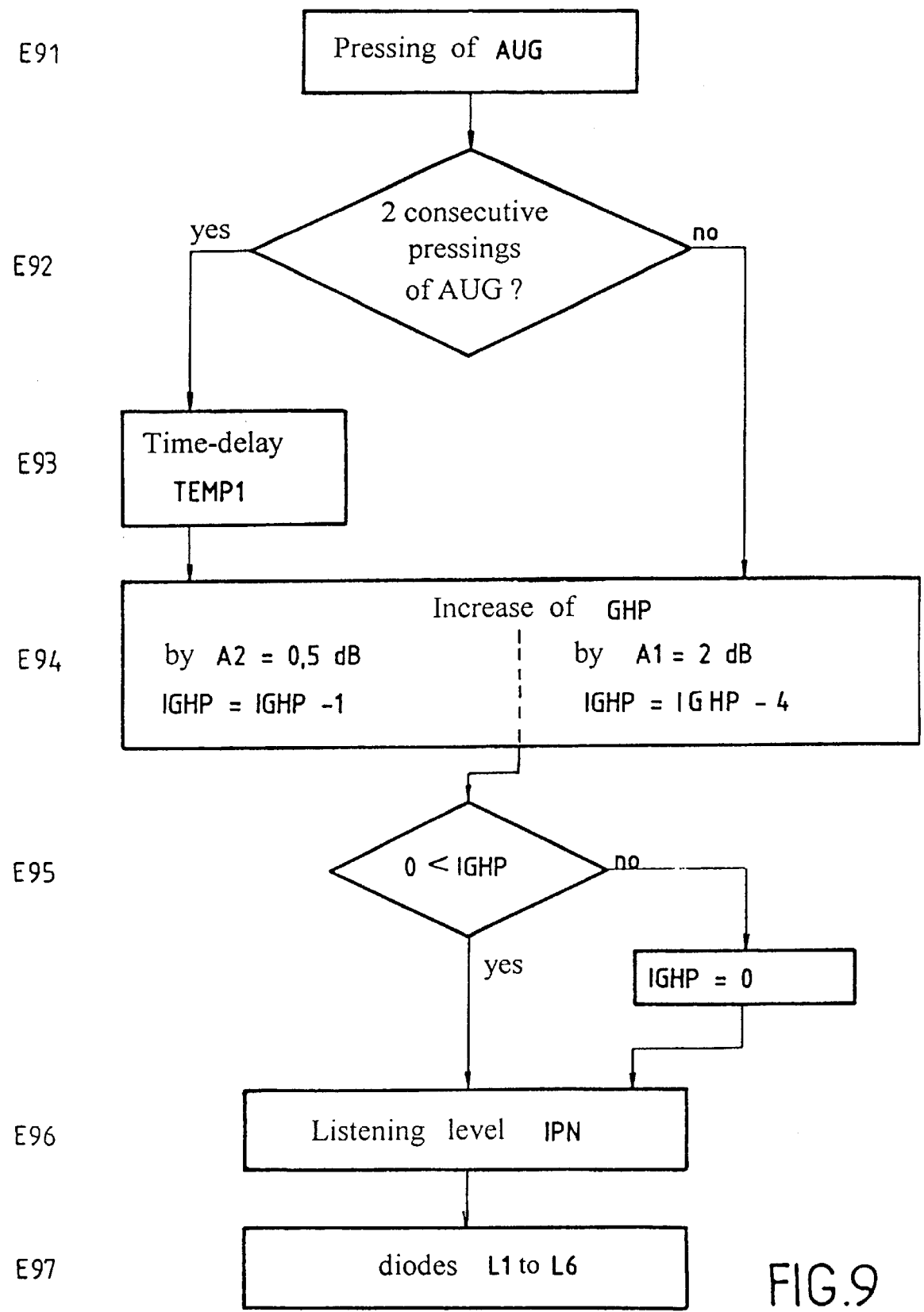
FIG. 9 is an algorithm of the invention for increasing the loudspeaker gain.

Referring to FIG. 9, an algorithm for increasing the loudspeaker gain GHP comprises seven steps E91 through E97. The user presses the AUG key on the keypad of the telephone terminal in the step E91. The step E92 checks if this is an isolated pressing of the key or if it is consecutive upon a previous pressing of the AUG key separated by less than a predetermined separation time, corresponding to the situation of the user holding the AUG key down, for example. If the pressing of the AUG key is an isolated pressing, the step E94 increases the loudspeaker gain GHP by a predetermined increment A1, for example 2 dB, and therefore decrements the index IGHP by 4. If the pressing of the AUG key follows on from a previous pressing separated by a time less than the predetermined separation time, for example a time of one second, the step E93 starts a predetermined time-delay TEMP1 in the order of 0.25 sec. to 1 sec. After this time-delay TEMP1, the step E94 increases the gain GHP by a predetermined increment A2, for example 0.5 dB, and consequently decrements the index IGHP by one unity. As explained below, the parameters A1 and TEMP1 are determined in accordance with the listening comfort.

The step E95 monitors the variation of the index IGHP which must remain between two predetermined limiting values, for example 0 and IGHPMAX. If the calculated index IGHP leaves this range, in this instance falling below it, the limit value "0" is assigned to it.

The value of the index IGHP is determined at the end of the step E95.

The step E96 calculates the level range index IPN as previously described with reference to the step E81. Depending on the value of the index IPN, one of the diodes L1 through LM=L6 is turned on in the step E97 to advise the user of the new listening level resulting from them pressing the AUG key. The steps E96 and E97 are identical to the steps E81 and E82.

Figure 10:
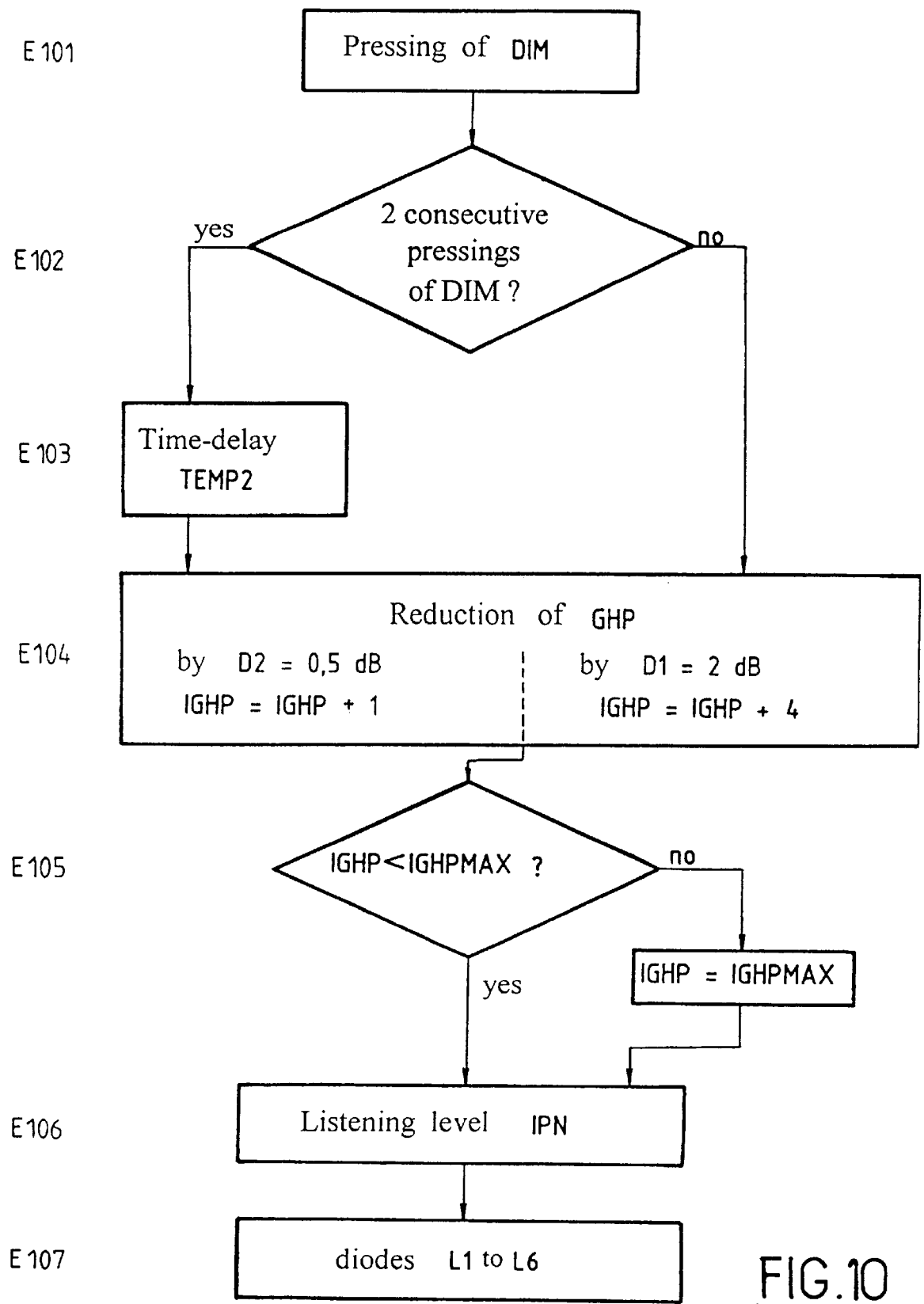
FIG. 10 is an algorithm of the invention for reducing the loudspeaker gain.

Referring to FIG. 10, an algorithm for reducing the loudspeaker gain GHP after the user presses the DIM key on the keypad comprises seven steps E101 through 107 similar to steps E91 through E97, respectively.

Step E101 consists in the pressing of the DIM key. As for incrementing (FIG. 9), the algorithm distinguishes an isolated pressing of the key and a pressing consecutive upon a previous pressing of the key separated by less than a predetermined separation time. In the former case, the gain GHP is reduced by a predetermined decrement D1, for example 2 dB, and the index IGHP is increased by 4 (step E104). In the latter case, the loudspeaker gain GHP is reduced by a predetermined decrement D2, for example 0.5 dB, and the index IGHP is increased by one unity (step E104) after a predetermined time-delay TEMP2 (step E103) equal to or different from TEMP1. As explained below (FIG. 11), the parameters D1 and TEMP2 are determined according to the listening comfort.

The step E105 checks that the index IGHP lies between the two predetermined limit values "0" and IGHPMAX. If the index IGHP leaves this range, in this instance rising above it, the limit value IGHPMAX is assigned to it.

Figure 11:
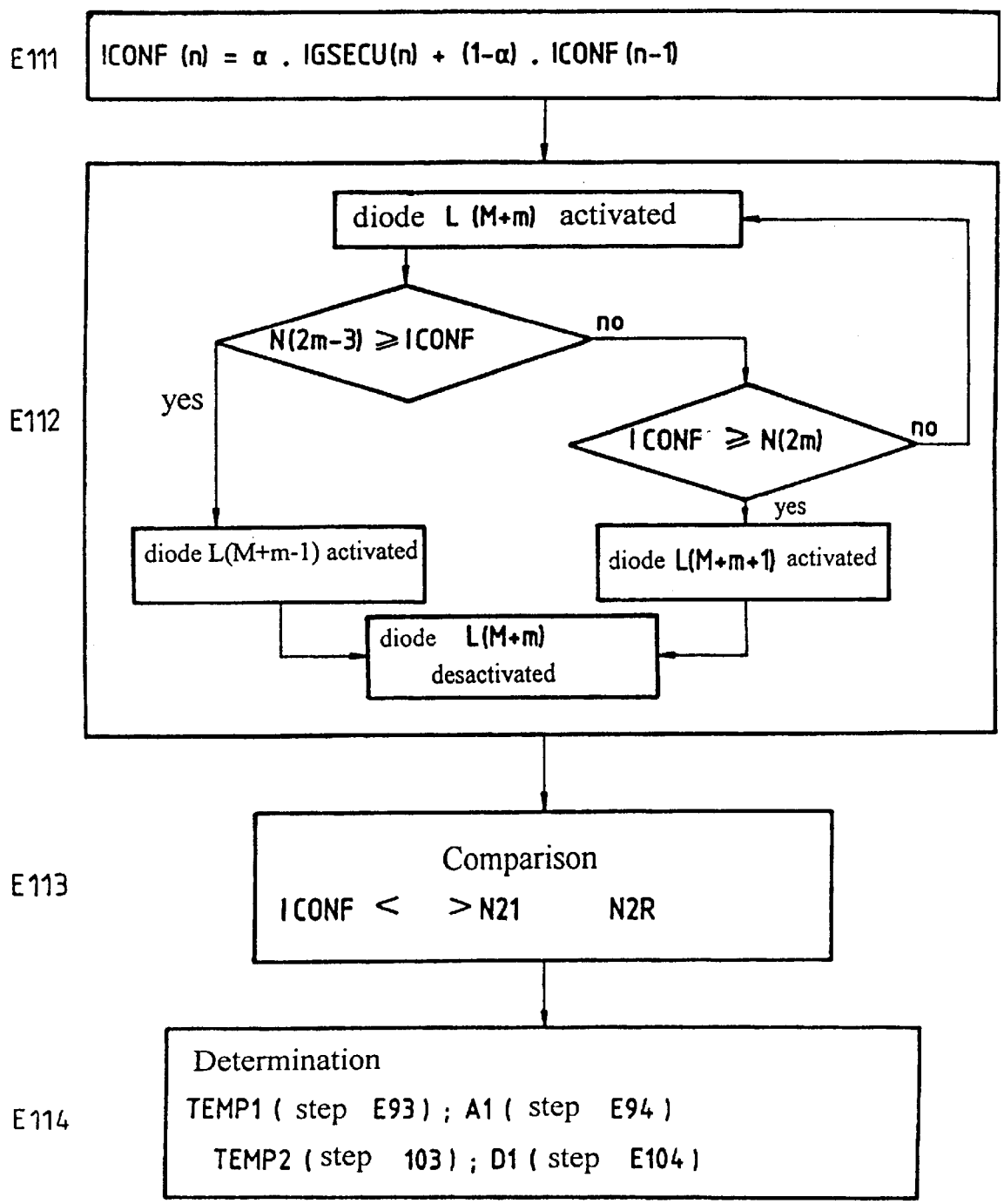
FIG. 11 is an algorithm of the invention for determining loudspeaker gain increase and reduction parameters.

Referring to FIG. 11, an algorithm for determining loudspeaker gain increase and reduction parameters comprises four cyclic steps E111 through E114.

The step E111 consists in determining a listening comfort index ICONF. The listening comfort index ICONF is obtained at time n by low-pass filtering of the security attenuation index IGSECU determined in the substep E33, using the relation:

$$ICONF(n)=\alpha \cdot IGSECU(n)+(1-\alpha) \cdot ICONF(n-1),$$

wherein $\alpha$ is a coefficient equal to $\frac{1}{32}$, for example, and ICONF(n−1) is the comfort index determined at the preceding time n−1. The listening comfort index is determined cyclically, for example at the sampling frequency of the peak envelope detectors DEC1 through DEC6. The value of the listening comfort index determined at a given time n is stored until the next time n+1. Hereinafter, to simplify the notations, the comfort index ICONF(n) is denoted ICONF. The listening comfort of the user is maximum if the comfort index ICONF is null, and decreases as the index ICONF increases.

In the step E112, the comfort index ICONF is compared to first thresholds, called as display thresholds, N1 through NQ, where Q is an integer dependent on the number M of comfort index diodes L(M+1) through L2M in accordance with the relation Q=2(M−1), and equal to 10 if M is equal to 6 as in the example under discussion. The result of comparing the index ICONF with the first thresholds is displayed by activating one of the diodes L7 through L2M=L12, as explained below.

Figure 12:
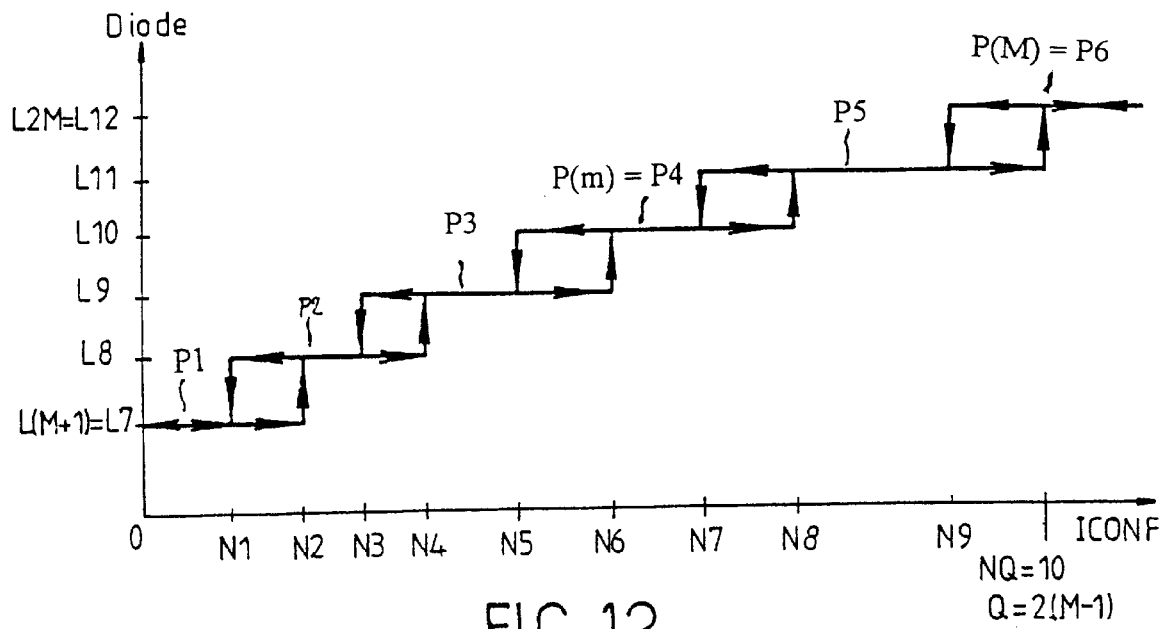
FIG. 12 is a display diagram of the invention showing a listening comfort index.

As shown in FIG. 12, the display thresholds N1 through N10 are associated in pairs to define variation ranges P1 through P(M)=P6 of the comfort index ICONF which overlap partially in pairs. Each range of variation is a platform associated with one of the diodes L7 through L12. Accordingly, the diodes L7 through L12 are activated progressively according to the platforms defined by the first thresholds N1 through N10 and terminated by hysteresis cycles. A given diode L(M+m), m being an integer between 1 and M, for example the diode L10, remains activated for as long as the index ICONF is in the range P(m) delimited by respective first thresholds N(2m−3)=N5 and N(2m)=N8 which define the limits of the platform associated with the diode L(M+m) between which there are two other thresholds N(2m−2)=N6 and N(2m−1)=N7. If the index ICONF crosses the first lower threshold, the diode of lower rank L(M+m−1)=L9 is activated and is not deactivated unless the index ICONF crosses the first higher threshold N(2m−2)=N6 associated with the diode L(M+m−1)=L9 and greater than the first lower threshold N(2m−3)=N5 of the diode L(M+m)=L10. Likewise, if the diode L(M+m)=L10 is activated, and then the index ICONF crosses the first higher threshold N(2m)=N8, the diode of higher rank L(M+m+1)=L11 is activated and is deactivated only if the index ICONF crosses the first lower threshold N(2m−1)=N7 associated with the diode L(M+m+1)=L11 and less than the first higher threshold N(2m)=N8 of the diode L(M+m)=L10.

The lengths of the platforms, i.e. the differences between the first lower and higher thresholds of the diodes, and the widths of the hysteresis cycles, i.e. the differences between the first lower threshold of one diode and the first higher threshold of a preceding diode, are a priori different from each other, respectively.

As shown in FIG. 12, the rank of the diode activated increases with the listening comfort index, i.e. as listening comfort deteriorates. Accordingly, the green diodes L7 through L9 associated with the ranges P1 through P3 indicate a high level of comfort, the yellow or orange diodes L10 and L11 associated with the ranges P4 and P5 indicate a moderate level of comfort and the red diode L12 associated with the range P6 indicates a low level of comfort. The colors of the diodes with wavelengths increasing with the comfort index encourage the user to reduce the loudspeaker gain by pressing the DIM key so that the diodes of higher rank do not remain turned on.

The step E113 compares the comfort index with second thresholds N21 through N2R defining adjacent ranges of variation of the listening comfort index ICONF. The second thresholds are a priori different from the first thresholds N1 through NQ and the index R is different from Q. However, for practical reasons, they may be made equal to the first thresholds, or to some of the latter if there are fewer second thresholds than first thresholds.

Depending on the result of the comparisons in the step E113, the step E114 determines the values of the gain increase increment A1, the gain decrease decrement D1 and the time-delays TEMP1 and TEMP2.

As an alternative to this, the second thresholds are different for the ranges of variation used to determine the gain increase increment A1, the gain decrease decrement D1 and the time-delays TEMP1 and TEMP2, i.e. in total four sets of second thresholds.

In all cases, the parameters A1, D1, TEMP1 and TEMP2 determined in the step E114 are used to calculate the increase or decrease in the gain GHP (steps E93 and E94, or E103 and E104) if the user presses the AUG key (step E91) or the DIM key (step E101).

Referring to FIGS. 13 through 16, R=3 second thresholds N21 through N2R=N23 are made equal to N3, N6 and N10, respectively. The second thresholds define four ranges of variation of the comfort index ICONF, each of which is associated with respective platforms for the gain increase increment A1, the gain decrease decrement D1 and the time-delays TEMP1 and TEMP2.

Figure 13:
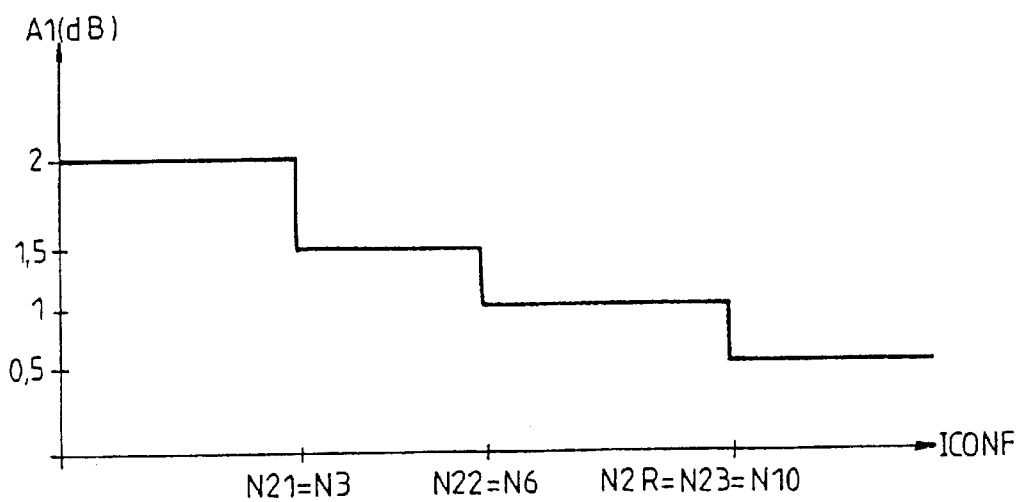
FIG. 13 is a diagram of the invention showing variation of a loudspeaker gain increase increment as a function of the listening comfort index.
Figure 15:
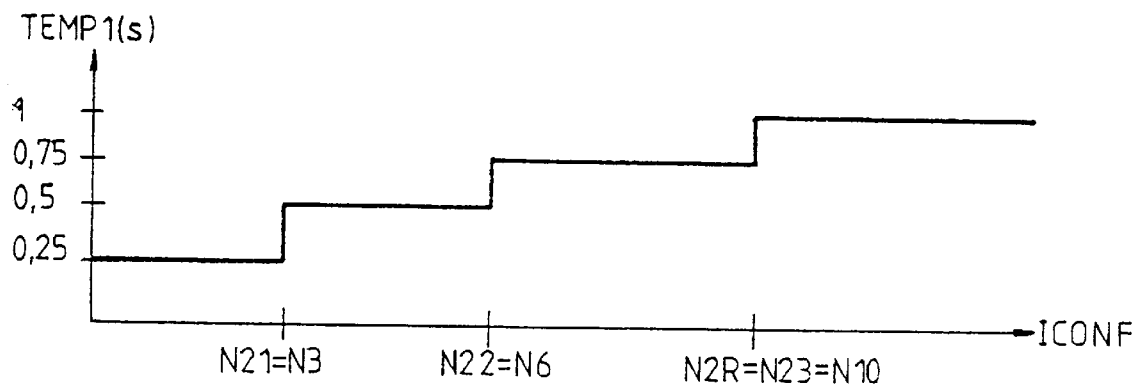
FIG. 15 is a diagram of the invention showing variation of a time-delay for increasing the loudspeaker gain as a function of the listening comfort index.

Accordingly, as shown in FIGS. 13 and 15, the lower the comfort index and the better the listening comfort, the greater the gain increase increment A1 and the shorter the time-delay TEMP1, allowing a greater and faster variation of the loudspeaker gain GHP if the user presses the AUG key to increase the gain (FIG. 9). The greater the comfort index and the worse the listening comfort, a lesser and slower variation of the loudspeaker gain results if the user seeks to increase the gain, because this would reduce listening comfort.

Figure 14:
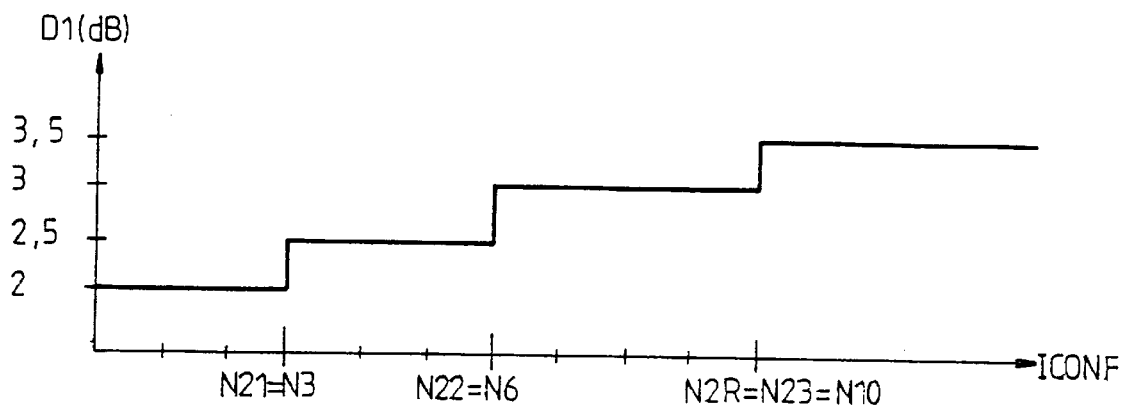
FIG. 14 is a diagram of the invention showing variation of a loudspeaker gain reduction decrement as a function of the listening comfort index.
Figure 16:
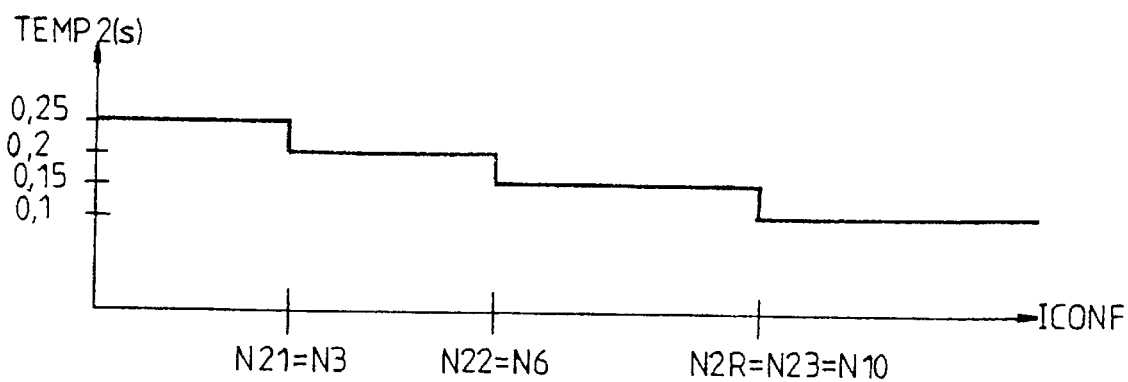
FIG. 16 is a diagram of the invention showing variation of a time-delay for reducing the loudspeaker gain as a function of the listening comfort index.

Conversely, as shown in FIGS. 14 and 16, the gain decrease decrement D1 increases and the time-delay TEMP2 decreases if the comfort index ICONF increases. If the user wishes to reduce the loudspeaker gain GHP by pressing the DIM key (FIG. 10), a lesser and slower variation is produced if the comfort is good. If the comfort deteriorates, a greater and faster variation is produced, since reducing the loudspeaker gain improves listening comfort.

Figure 17:
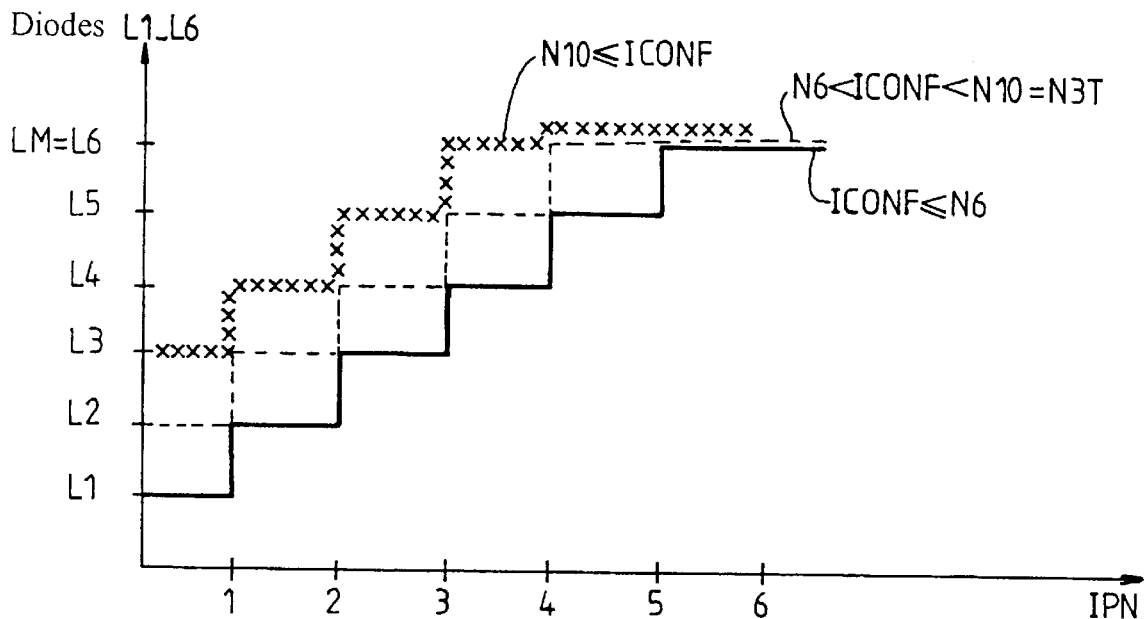
FIG. 17 is a display diagram of the invention showing the listening level as a function of the listening comfort index.

Activation of the listening level diodes L1 through L6 depends on the comfort index ICONF. As shown in FIG. 17, activation of the diodes L1 through LM=L6 in accordance with the level range index IPN (steps E81, E82) is shown for three ranges of variation of the index ICONF. The three ranges of variation are defined by third or offset thresholds N31 through N3T, of which there are two, for example, respectively equal to N6 and N3T=N10.

If the comfort is good, i.e. if the index ICONF is low and below the threshold N6, the diodes L1 through L6 are activated as described with reference to the steps E81 and E82. If the comfort deteriorates, the index ICONF increases and is then between N6 and N10, for example. Activation of the diodes L1 through L6 is modified so that the diode having a rank one unity higher than the diode that would be activated by steps E81 and E82 in correspondence with the actual level defined by the index IPN is activated. If the index ICONF is more than the threshold N10, then the comfort is even worse and the diode activated is that with a rank two unities higher than the diode corresponding to the index IPN. As can be seen in FIG. 17, if the diode activated corresponding to the index IPN is the diode L6, then the index ICONF has no effect. If the diode activated corresponding to the index IPN is L5, the diode activation "offset" is only one unity maximum.

Accordingly, the worse the comfort, i.e. the higher the index ICONF, the more the rank of the activated diode L1 through L6 is "offset" towards a higher rank to indicate to the user a dummy listening level higher than the level defined by the index IPN, which encourages the user not to increase, and even to decrease the loudspeaker gain, which tends to increase listening comfort.

The effects of ICONF on the parameters A1, D1, TEMP1 and TEMP2, and on the activation/deactivation of the diodes L1 through L6 can be combined to enhance the influence of the comfort index ICONF on the evolution of the loudspeaker gain GHP, or only one or a few of these effects can be chosen.

As an alternative, the increase increment A2 (step E94) and the decrease decrement D2 (step E104) are also determined according to the index ICONF.

Figure 18:
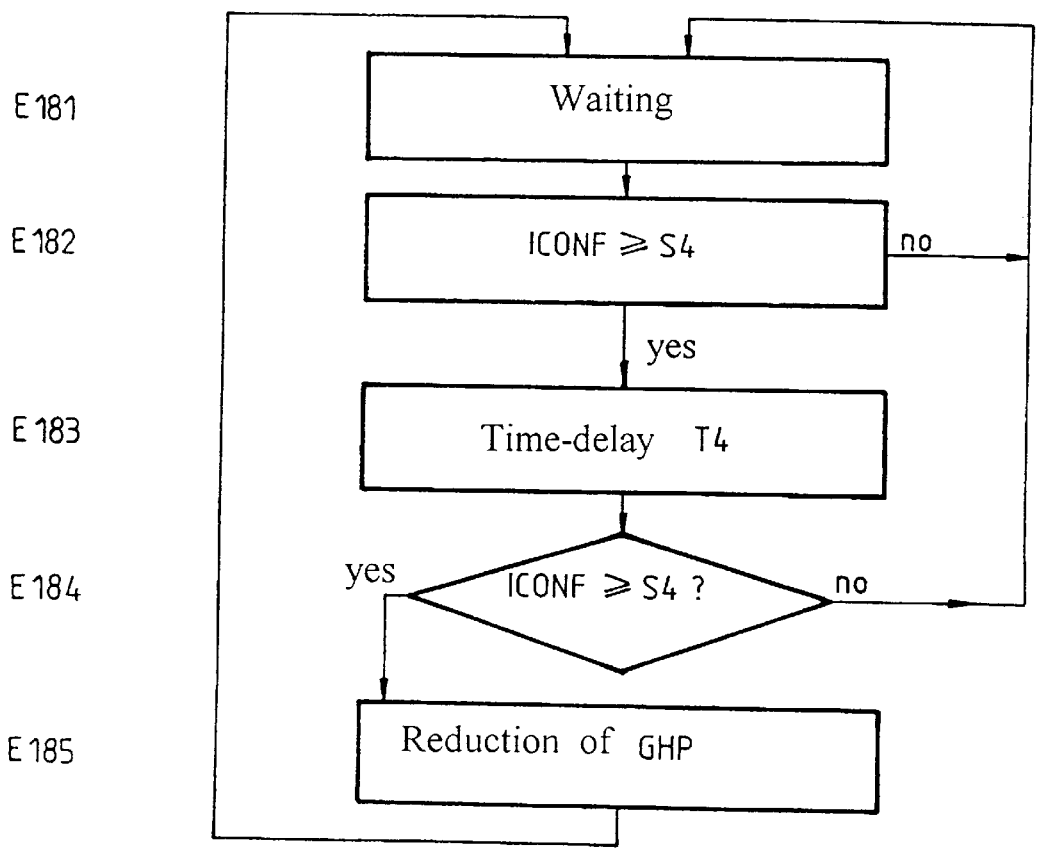
FIG. 18 is an algorithm of the invention for reducing the loudspeaker gain as a function of the listening comfort index.

Furthermore, other effects of the comfort index ICONF on the loudspeaker gain GHP are operative without the user actuating the AUG and DIM keys. Referring to FIG. 18, after a waiting step E181, if the comfort index ICONF is more than a high predetermined fourth threshold S4 (step 182), a time-delay T4 is triggered, equal to 30 s, for example (step E183). During time-delay T4 the listening comfort index ICONF is compared to the threshold S4 cyclically, for example in each cycling period of the peak envelope detectors. If the index ICONF is more than the threshold S4 during the time-delay T4 (step E184) then the loudspeaker gain GHP is reduced by a predetermined value equal to 0.5 dB after the time-delay T4 (step E185). The algorithm then loops to the waiting step E181. If the comfort index ICONF is no longer more than the threshold S4 during the time-delay T4, then the algorithm loops to the waiting step E181.

What we claim is:

1. A method of loudspeaker gain correction in a hands-free telephone terminal, said telephone terminal having a loudspeaker at the output of a receive channel and a microphone at the input of a transmit channel, and gain control means for commanding modifications of a loudspeaker gain, the transmit and receive channels being served by a telephone line, said method comprising the cyclic steps of:

measuring a transmit signal on the transmit channel and a receive signal on the receive channel, determining a transmit compression gain and a receive compression gain respectively so that a product of the measured transmit signal by said transmit compression gain lies between two predetermined thresholds and a product of the measured receive signal by said receive compression gain lies between two other predetermined thresholds, measuring an output signal of said microphone on said transmit channel and an input signal of said loudspeaker on said receive channel, comparing the measured microphone output signal and the measured loudspeaker input signal to determine an acoustic echo path gain between said loudspeaker and said microphone, determining a stability gain as a function of said transmit compression gain, receive compression gain, acoustic echo path gain and loudspeaker gain, determining a listening comfort index as a function of said stability gain and the listening comfort index of a preceding cycle, comparing said listening comfort index with predetermined index thresholds, selecting two of the predetermined index thresholds bracketing said listening comfort index and defining a range of variation of said listening comfort index with which gain modification parameters are associated, and modifying the loudspeaker gain controlled by said gain control means by weighting the loudspeaker gain by said gain modification parameters.

2. A correction method according to claim 1 wherein said telephone terminal comprises acoustic echo canceller means through which the transmit and receive channels pass, further including the step of:

measuring an input signal of said acoustic echo canceller means on said transmit channel for comparison with said measured transmit signal, said measured transmit signal being measured at the output of said acoustic echo canceller means, thereby determining an acoustic echo canceller gain between the input and the output of said transmit channel in said acoustic echo canceller means, said stability gain being determined also according to said acoustic echo canceller gain.

3. A correction method according to claim 1 comprising the steps of:

measuring a signal at the output of said transmit channel and a signal at the input of said receive channel, and comparing the signals measured at said output of said transmit channel and at the input of said receive channel to determine an electric echo path gain between the output of said transmit channel and the input of said receive channel, said stability gain being determined also according to the electric echo path gain.

4. A correction method according to claim 3 wherein said telephone terminal comprises electric echo canceller means at the output of said transmit channel and at the input of said receive channel, further including the step of:

measuring an output signal of said electric echo cancelling means on said receive channel for comparison with the signal measured at the input of said receive channel, said receive channel input corresponding to the input of said electric echo canceller means, thereby determining an electric echo canceller gain between the input and output of said receive channel in said electric echo canceller means, said stability gain being determined also in accordance with said electric echo canceller gain.

5. A correction method according to claim 1, wherein said gain modification parameters are constant within any range of variation of said listening comfort index defined by two of said predetermined thresholds.

6. A correction method according to claim 1, wherein said gain modification parameters include a loudspeaker gain increase increment which varies in inverse proportion to said listening comfort index.

7. A correction method according to claim 1, wherein said gain modification parameters include a time-delay between two successive loudspeaker gain increases corresponding to two successive commands to increase said loudspeaker gain, the time-delay between two increases varying in direct proportion to said listening comfort index.

8. A correction method according to claim 7, comprising consecutively upon a command to increase the loudspeaker gain, the steps of:
   verifying if the increase command is separated by less than a predetermined separation timed from a preceding increase command, and
   in the affirmative, to increase with a predetermined increase said loudspeaker gain only after the increase time-delay.

9. A correction method according to claim 1, wherein said gain modification parameters include a loudspeaker gain decrease decrement, which varies in direct proportion to said listening comfort index.

10. A correction method according to claim 1, wherein the gain modification parameters include a time-delay between two successive loudspeaker gain decreases corresponding to two successive commands to decrease said loudspeaker gain, the time-delay between two decreases varying in inverse proportion to said listening comfort index.

11. A correction method according to claim 10, comprising consecutively upon a command to decrease the loudspeaker gain, the steps of:
   verifying if the decrease command is separated by less than a predetermined separation timed from a preceding decrease command, and
   in the affirmative, to decrease with a particular decrease decrement the loudspeaker gain only after the decrease time-delay.

12. A correction method according to claim 1, comprising the step of displaying the value of the listening comfort index by activating one of plural first display means.

13. A correction method according to claim 12, wherein the step of displaying the value of the listening comfort index comprises:
   comparing said listening comfort index to predetermined lower and upper display thresholds, said lower display thresholds being respectively linked to the upper display thresholds to define ranges of variation of said listening comfort index which overlap partially in pairs, each range of variation of said listening comfort index being associated with one of said plural first display means,
   activating the first display means associated with the range of variation in which said comfort index is located if said comfort index lies between said lower and upper display thresholds defining the range of variation,
   activating the first display means of lower rank, if said comfort index leaves the range of variation associated with the display means activated by the lower threshold defining the range of variation, and
   activating the first display means of higher rank, if said comfort index leaves the range of variation associated with the display means activated by the upper threshold defining the range of variation.

14. A correction method according to claim 13, wherein said plural first display means are of various colors, the wavelengths of said various colors increasing with the comfort index.

15. A correction method according to claim 1, comprising: displaying the value of the loudspeaker gain on plural second display means.

16. A correction method according to claim 15, wherein the step of displaying said value of the loudspeaker gain, said second display means display a gain value more than the actual value of said loudspeaker gain if said comfort index is more than a predetermined offset threshold.

17. A correction method according to claim 1, comprising the steps of:
   comparing said listening comfort index with a high predetermined fourth threshold, and
   reducing the loudspeaker gain by a predetermined value if said listening comfort index is more than the fourth threshold during a predetermined time-delay.

* * * * *